(12) United States Patent
Yan et al.

(10) Patent No.: US 10,064,065 B2
(45) Date of Patent: Aug. 28, 2018

(54) DOWNLINK DIRECTION REMOTE RADIO UNIT SELECTION DECISION METHOD AND APPARATUS

(71) Applicant: Huawei Technologies Co., Ltd., Shenzhen (CN)

(72) Inventors: Haidong Yan, Shanghai (CN); Wei Chen, Shanghai (CN); Jiang Guo, Shanghai (CN); Huaijie Xue, Shanghai (CN); Zhiwei Su, Xi'an (CN); Jingquan Liu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 14/732,431

(22) Filed: Jun. 5, 2015

(65) Prior Publication Data
US 2015/0271683 A1 Sep. 24, 2015

Related U.S. Application Data

(63) Continuation of application No. PCT/CN2012/086067, filed on Dec. 6, 2012.

(51) Int. Cl.
*H04W 16/14* (2009.01)
*H04W 24/10* (2009.01)
(Continued)

(52) U.S. Cl.
CPC ............ *H04W 16/14* (2013.01); *H04B 7/024* (2013.01); *H04W 24/10* (2013.01); *H04W 48/20* (2013.01);
(Continued)

(58) Field of Classification Search
CPC ... H04W 48/20; H04W 24/10; H04W 72/042; H04B 7/024
See application file for complete search history.

(56) References Cited

U.S. PATENT DOCUMENTS

| 7,286,843 | B2 * | 10/2007 | Scheck | ................ | H04W 64/00 370/241 |
| 2002/0191554 | A1 * | 12/2002 | Kondo | ................ | H04W 64/00 370/328 |

(Continued)

FOREIGN PATENT DOCUMENTS

| CN | 101389118 A | 3/2009 |
| CN | 101448306 A | 6/2009 |

(Continued)

OTHER PUBLICATIONS

"Generic Configuration of DL CoMP Modes," 3GPP TSG RAN WG1 Meeting #58, Shenzhen, China, R1-093349, 3$^{rd}$ Generation Partnership Project, Valbonne, France (Aug. 24-28, 2009).

(Continued)

*Primary Examiner* — Kevin C Harper
*Assistant Examiner* — Henry Baron
(74) *Attorney, Agent, or Firm* — Leydig, Voit & Mayer, Ltd.

(57) ABSTRACT

A method includes: an RRU selection decision cycle of a current RRU shared cell arriving; and determining, according to a current downlink measurement item of a user terminal and an uplink measurement item of each RRU, that at least one RRU among the RRUs transmits a downlink carrier signal; or, determining, according to the current downlink measurement item of the user terminal, the uplink measurement item of each RRU, and power specification of each RRU, that at least one RRU among the RRUs transmits a downlink carrier signal, where a downlink channel includes: a traffic channel and a stand-alone dedicated control channel.

22 Claims, 7 Drawing Sheets

(51) Int. Cl.
  *H04W 72/04* (2009.01)
  *H04W 48/20* (2009.01)
  *H04B 7/024* (2017.01)
  *H04W 88/08* (2009.01)
(52) U.S. Cl.
  CPC ........ *H04W 72/042* (2013.01); *H04W 88/085* (2013.01)

(56) References Cited

U.S. PATENT DOCUMENTS

| | | | | |
|---|---|---|---|---|
| 2010/0296469 | A1* | 11/2010 | Zhou | H04W 28/02 370/329 |
| 2011/0034196 | A1 | 2/2011 | Jonishi | |
| 2011/0096688 | A1* | 4/2011 | Sachs | H04W 48/18 370/252 |
| 2012/0045211 | A1 | 2/2012 | Tan et al. | |
| 2012/0213128 | A1 | 8/2012 | Miyata | |
| 2012/0281555 | A1 | 11/2012 | Gao et al. | |
| 2013/0109402 | A1 | 5/2013 | Zhou et al. | |
| 2013/0279362 | A1 | 10/2013 | Park et al. | |

FOREIGN PATENT DOCUMENTS

| | | |
|---|---|---|
| CN | 101466134 A | 6/2009 |
| CN | 101877687 A | 11/2010 |
| CN | 101982995 A | 3/2011 |
| CN | 102387488 A | 3/2012 |
| CN | 102388645 A | 3/2012 |
| EP | 2621221 A1 | 7/2013 |
| WO | WO 2012093759 A1 | 7/2012 |

OTHER PUBLICATIONS

"3$^{rd}$ Generation Partnership Project; Technical Specification Group Radio Access Network; Coordinated Multi-Point Operation for LTE Physical Layer Aspects (Release 11)," 3GPP TR 36.819, V0.0.1, pp. 1-13, 3$^{rd}$ Generation Partnership Project, Valbonne, France (Feb. 2011).

* cited by examiner

DOWNLINK DIRECTION REMOTE RADIO UNIT SELECTION DECISION METHOD AND APPARATUS

CROSS-REFERENCE TO RELATED APPLICATIONS

This application is a continuation of International Patent Application No. PCT/CN2012/086067, filed on Dec. 6, 2012, which is hereby incorporated by reference in its entirety.

TECHNICAL FIELD

The present invention relates to the field of communications, and in particular, to a downlink direction remote radio unit selection decision method and apparatus.

BACKGROUND

A remote radio unit (Remote Radio Unit, RRU) shared cell is mainly applied in a networking scenario of the high-speed rail. In this scenario, voice service transmission adopts a mode in which all RRUs transmit a downlink carrier signal or two RRUs transmit a downlink carrier signal.

As networking scenarios of the current network evolve constantly, the RRU shared cell is not only applied to the high-speed rail, but also increasingly applied in networking scenarios of common residential areas. No matter in which scenario is the application, keeping multiple or two RRUs to transmit a downlink carrier signal inevitably increases power consumption of a base station and network interference. Therefore, the transmission mode of the RRU needs to be changed, so as to decrease probability that two or more RRUs in an RRU shared cell transmit a downlink carrier signal, thereby decreasing network interference and RRU power consumption.

SUMMARY

The technical problem to be solved by embodiments of the present invention is to provide a downlink direction remote radio unit RRU selection decision method and apparatus, so as to timely switch an RRU transmission mode and select a suitable RRU to transmit a downlink carrier signal, thereby reducing network interference and RRU power consumption.

In order to solve the technical problem, according to a first aspect of an embodiment of the present invention, the embodiment of the present invention provides a downlink direction remote radio unit RRU selection decision method. The method includes:

an RRU selection decision cycle of a current RRU shared cell arriving; and determining, according to a current downlink measurement item of a user terminal and an uplink measurement item of each RRU, that at least one RRU among the RRUs transmits a downlink carrier signal; or, determining, according to the current downlink measurement item of the user terminal, the uplink measurement item of each RRU, and power specification of each RRU, that at least one RRU among the RRUs transmits a downlink carrier signal, where a downlink channel includes: a traffic channel and a stand-alone dedicated control channel.

As a first possible implementation manner of the first aspect of the embodiment of the present invention, the determining, according to a current downlink reception level or quality of a user terminal and an uplink reception level or quality of each RRU, that at least one RRU among the RRUs transmits a downlink carrier signal includes:

step a: determining a current RRU transmission mode; and step b: performing judgment according to a current downlink reception level or quality and an uplink reception level or quality of each RRU, so as to determine whether to switch from the current RRU transmission mode to that a corresponding RRU transmits the downlink carrier signal.

With reference to the first possible implementation manner of the first aspect, a second possible implementation manner of the first aspect is further provided, and step b includes:

when the current RRU transmission mode is that a single RRU transmits the downlink carrier signal, if the current downlink reception level or quality reaches a first threshold value, keeping the current RRU transmission mode unchanged; or, if a difference between the current downlink reception level or quality and the first threshold value is less than 0, and an estimated downlink diversity gain incurred by that two adjacent RRUs of a user terminal simultaneously transmit the downlink carrier signal is greater than an absolute value of the difference, selecting the two adjacent RRUs to transmit the downlink carrier signal; or, if the difference between the current downlink reception level or quality and the first threshold value is less than 0 and the estimated downlink diversity gain incurred by that two adjacent RRUs of the user terminal simultaneously transmit the downlink carrier signal is less than or equal to the absolute value of the difference, selecting multiple RRUs among the RRUs to transmit the downlink carrier signal.

With reference to the second possible implementation manner of the first aspect, a third possible implementation manner of the first aspect is further provided, the uplink reception levels of the RRUs are sorted in descending order, the first two RRUs are the two adjacent RRUs of the user terminal, the estimated downlink diversity gain incurred by that the two simultaneously transmit the downlink carrier signal corresponds to a spatial distance between the two, or corresponds to a difference between the uplink reception levels of the two.

With reference to the first possible implementation manner of the first aspect, a fourth possible implementation manner of the first aspect is further provided, and step b includes:

when the current RRU transmission mode is that two RRUs transmit the downlink carrier signal, if the current downlink reception level or quality is greater than a second threshold value, selecting an RRU with the greatest uplink reception level among the RRUs to transmit the downlink carrier signal; or, if the current downlink reception level or quality is less than a third threshold value, selecting multiple RRUs among the RRUs to transmit the downlink carrier signal; or, if the current downlink reception level or quality is greater than the third threshold value but less than the second threshold value, keeping the current RRU transmission mode unchanged.

With reference to the first possible implementation manner of the first aspect, a fifth possible implementation manner of the first aspect is further provided, and step b includes:

when the current RRU transmission mode is that multiple RRUs transmit the downlink carrier signal, if the current downlink reception level or quality is greater than a fourth threshold value, selecting an RRU with the greatest uplink reception level among the RRUs to transmit the downlink carrier signal; otherwise, keeping the current RRU transmission mode unchanged.

As a sixth possible implementation manner of the first aspect, the determining, according to a current downlink measurement item of a user terminal, an uplink measurement item of each RRU, and power specification of each RRU, that at least one RRU among the RRUs transmits a downlink carrier signal includes:

step c: determining a current RRU transmission mode; and step d: performing judgment according to the current downlink measurement item of the user terminal, the uplink measurement item of each RRU, and the power specification of each RRU, so as to determine whether to switch from the current RRU transmission mode to that a corresponding RRU transmits the downlink carrier signal.

With reference to the sixth possible implementation manner of the first aspect, a seventh possible implementation manner of the first aspect is further provided, and step d includes:

when the current RRU transmission mode is that a single RRU transmits the downlink carrier signal, if a current downlink reception level or quality reaches a first threshold value, but an uplink reception level of the single RRU is not the greatest one among uplink reception levels of the RRUs, performing evaluation according to power specification and uplink path loss of an RRU with the greatest uplink reception level among the RRUs and power specification and uplink path loss of the single RRU that currently transmits the downlink carrier signal, so as to determine whether to select the RRU with the greatest uplink reception level among the RRUs to transmit the downlink carrier signal.

With reference to the sixth possible implementation manner of the first aspect, an eighth possible implementation manner of the first aspect is further provided, and step d includes:

when the current RRU transmission mode is that two RRUs transmit the downlink carrier signal, when a current downlink reception level or quality is greater than a third threshold value but less than a second threshold value, sorting uplink reception levels of the RRUs in descending order to determine the first two RRUs; if at least one of the two RRUs that currently transmit the downlink carrier signal is not among the first two RRUs, performing evaluation according to power specification and uplink path loss of the RRU that is among the two RRUs that currently transmit the downlink carrier signal but is not among the first two RRUs ranked in order of the uplink reception level and power specification and uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

With reference to the first aspect or any aforementioned possible implementation manner of the first aspect, a ninth possible implementation manner of the first aspect is further provided, and the method further includes: accessing, by the user terminal, the current RRU shared cell in the following manner:

step e: keeping that each RRU transmits the downlink carrier signal; and step f: when an RRU selection decision cycle arrives, determining, according to the current downlink reception level or quality and the uplink reception level of each RRU, whether to switch from that each RRU transmits the downlink carrier signal to that a single RRU or two RRUs among the RRUs transmit the downlink carrier signal.

With reference to the ninth possible implementation manner of the first aspect, a tenth possible implementation manner of the first aspect is further provided, and step f includes:

if the current downlink reception quality reaches a fifth threshold value and the uplink reception levels of at least two RRUs among the RRUs reach a sixth threshold value, selecting two RRUs with the greatest uplink reception levels among the at least two RRUs to transmit the downlink carrier signal; or if the current downlink reception quality reaches the fifth threshold value, and the uplink reception level of at least one RRU among the RRUs reaches the sixth threshold value, selecting an RRU with the greatest uplink reception level among the at least one RRU to transmit the downlink carrier signal.

With reference to the first aspect or any aforementioned possible implementation manner of the first aspect, an eleventh possible implementation manner of the first aspect is further provided, and the method further includes: configuring, by the current RRU shared cell, the current RRU shared cell as a neighboring cell of the current RRU shared cell, so that when a switch decision cycle arrives, an main BCCH multi-transmission reception level of the current RRU shared cell is used for participation in switch decision and basic sorting.

According to a second aspect of an embodiment of the present invention, the embodiment of the present invention provides a downlink direction remote radio unit RRU selection decision apparatus, and the apparatus includes:

a determination unit, configured to, when an RRU selection decision cycle of a current RRU shared cell arrives, determine, according to a current downlink measurement item of a user terminal and an uplink measurement item of each RRU, that at least one RRU among the RRUs transmits a downlink carrier signal; or, determine, according to the current downlink measurement item of the user terminal, the uplink measurement item of each RRU, and power specification of each RRU, that at least one RRU among the RRUs transmits a downlink carrier signal, where a downlink channel includes: a traffic channel and a stand-alone dedicated control channel.

As a first possible implementation manner of the second aspect, the determination unit includes:

a first determination subunit, configured to determine a current RRU transmission mode; and a second determination subunit, configured to perform judgment according to a current downlink reception level or quality and an uplink reception level of each RRU, so as to determine whether to switch from the current RRU transmission mode to that a corresponding RRU transmits the downlink carrier signal.

With reference to the first possible implementation manner of the second aspect, a second possible implementation manner of the second aspect is further provided, and the second determination subunit includes:

a first judgment execution module, configured to, when the current RRU transmission mode is that a single RRU transmits the downlink carrier signal, perform RRU selection decision, and configured to: when a difference between the current downlink reception level or quality and a first threshold value is greater than or equal to 0, keep the current RRU transmission mode unchanged; or, when the difference between the current downlink reception level or quality and the first threshold value is less than 0 and an estimated downlink diversity gain incurred by that two adjacent RRUs of the user terminal simultaneously transmit the downlink carrier signal is greater than an absolute value of the difference, select the two adjacent RRUs to transmit the downlink carrier signal; or, when the difference between the current downlink reception level or quality and the first threshold value is less than 0 and the estimated downlink diversity gain incurred by that two adjacent RRUs of the user terminal simultaneously transmit the downlink carrier signal is less than or equal to the absolute value of the difference, select multiple RRUs among the RRUs to transmit the downlink carrier signal.

With reference to the second possible implementation manner of the second aspect, a third possible implementation manner of the second aspect is further provided, and the second determination subunit further includes:

a selection module, configured to sort uplink reception levels of the RRUs in descending order, and select the first two RRUs as two adjacent RRUs of the user terminal; and a storage module, configured to store correspondence between the estimated downlink diversity gain incurred by that the two adjacent RRUs of the user terminal simultaneously transmit the downlink carrier signal and a spatial distance between the two adjacent RRUs of the user terminal; or, store correspondence between the estimated downlink diversity gain incurred by that the two adjacent RRUs simultaneously transmit the downlink carrier signal and a difference between the uplink reception levels or quality of the two adjacent RRUs of the user terminal.

With reference to the first possible implementation manner of the second aspect, a fourth possible implementation manner of the second aspect is further provided, and the second determination subunit includes:

a second judgment execution module, configured to, when the current RRU transmission mode is that two RRUs transmit the downlink carrier signal, perform RRU selection decision, and configured to:

when the current downlink reception level or quality is greater than a second threshold value, select an RRU with the greatest uplink reception level among the RRUs to transmit the downlink carrier signal; or, when the current downlink reception level or quality is less than a third threshold value, select multiple RRUs among the RRUs to transmit the downlink carrier signal; or, when the current downlink reception level or quality is greater than the third threshold value but less than the second threshold value, keep the current RRU transmission mode unchanged.

With reference to the first possible implementation manner of the second aspect, a fifth possible implementation manner of the second aspect is further provided, and the second determination subunit includes:

a third judgment execution module, configured to, when the current RRU transmission mode is that multiple RRUs transmit the downlink carrier signal, perform RRU selection decision, and configured to:

when the current downlink reception level or quality is greater than a fourth threshold value, select an RRU with the greatest uplink reception level among the RRUs to transmit the downlink carrier signal; or, when the current downlink reception level or quality is less than or equal to the fourth threshold value, keep the current RRU transmission mode unchanged.

As a sixth possible implementation manner of the second aspect, the determination unit includes:

a third determination subunit, configured to determine a current RRU transmission mode; and a fourth determination subunit, configured to perform judgment according to the current downlink measurement item of the user terminal, the uplink measurement item of each RRU, and the power specification of each RRU, so as to determine whether to switch from the current RRU transmission mode to that a corresponding RRU transmits the downlink carrier signal.

With reference to the sixth possible implementation manner of the second aspect, a seventh possible implementation manner of the second aspect is further provided, and the fourth determination subunit includes:

a fourth judgment execution module, configured to, when the current RRU transmission mode is that a single RRU transmits the downlink carrier signal, perform RRU selection decision, and if the current downlink reception level or quality reaches a first threshold value, but an uplink reception level of the single RRU is not the greatest one among uplink reception levels of RRUs, perform evaluation according to power specification and uplink path loss of an RRU with the greatest uplink reception level among the RRUs and power specification and uplink path loss of the single RRU that currently transmits the downlink carrier signal, so as to determine whether to select the RRU with the greatest uplink reception level among the RRUs to transmit the downlink carrier signal.

With reference to the seventh possible implementation manner of the second aspect, an eighth possible implementation manner of the second aspect is further provided, and the fourth determination subunit further includes:

a sorting module, configured to sort the uplink reception levels of the RRUs in descending order, so as to determine the first two RRUs; and a fifth judgment execution module, configured to, when the current RRU transmission mode is that two RRUs transmit the downlink carrier signal, perform RRU selection decision, and if the current downlink reception level or quality is greater than a third threshold value but less than a second threshold value, perform evaluation according to the power specification and the uplink path loss of the RRU that is among the two RRUs that currently transmit the downlink carrier signal but is not among the first two RRUs ranked in order of the uplink reception level and the power specification and the uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

With reference to the second aspect and any aforementioned possible implementation manner of the second aspect, a ninth possible implementation manner of the second aspect is further provided, and the apparatus further includes:

an access unit, configured to make the user terminal access the current RRU shared cell; where the access unit includes:

a pre-transmission subunit, configured to keep that each RRU transmits the downlink carrier signal; and a switching subunit, configured to, when an RRU selection decision cycle arrives, determine, according to the current downlink reception quality and the uplink reception level of each RRU, whether to switch from that each RRU transmits the downlink carrier signal to that a single RRU or two RRUs among the RRUs transmit the downlink carrier signal.

With reference to the ninth possible implementation manner of the second aspect, a tenth possible implementation manner of the second aspect is further provided, and the switching subunit includes:

a first switching module, configured to, when the current downlink reception quality reaches a fifth threshold value and the uplink reception levels of at least two RRUs among the RRUs reach a sixth threshold value, select the first two RRUs ranked in descending order of the uplink reception level among the at least two RRUs to send the downlink carrier signal; and a second switching module, configured to, when the current downlink reception quality reaches the fifth threshold value and the uplink reception level of at least one RRU among the RRUs reaches the sixth threshold value, select the RRU with the greatest uplink reception level among the at least one RRU to transmit the downlink carrier signal.

With reference to the second aspect and any aforementioned possible implementation manner of the second aspect, an eleventh possible implementation manner of the second aspect is further provided, and the apparatus further includes:

a neighboring-cell configuration unit, configured to configure the current RRU shared cell as a neighboring cell of the current RRU shared cell, so that when a switch decision cycle arrives, an main BCCH multi-transmission reception level of the current RRU shared cell is used for participation in switch decision and basic sorting.

According to a third aspect of an embodiment of the present invention, the embodiment of the present invention provides a downlink direction remote radio unit RRU selection decision apparatus, and the apparatus includes:

a processor, configured to, when an RRU selection decision cycle of a current RRU shared cell arrives, determine, according to a current downlink measurement item of a user terminal and an uplink measurement item of each RRU, that at least one RRU among the RRUs transmits a downlink carrier signal; or, determine, according to the current downlink measurement item of the user terminal, the uplink measurement item of each RRU, and power specification of each RRU, that at least one RRU among the RRUs transmits a downlink carrier signal, where a downlink channel includes: a traffic channel and a stand-alone dedicated control channel.

As a first possible implementation manner of the third aspect, the apparatus further includes a first receiver.

The processor is configured to: determine a current RRU transmission mode; receive the current downlink measurement item of the user terminal and the uplink measurement item of each RRU through the first receiver, where the current downlink measurement item of the user terminal includes a current downlink reception level or quality, and the uplink measurement item of each RRU includes an uplink reception level of each RRU; and perform judgment according to the current downlink reception level or quality and the uplink reception level of each RRU, so as to determine whether to switch from the current RRU transmission mode to that a corresponding RRU transmits the downlink carrier signal.

With reference to the first possible implementation manner of the third aspect, a second possible implementation manner of the third aspect is further provided, the performing judgment according to the current downlink reception level or quality and the uplink reception level of each RRU to determine whether to switch from the current RRU transmission mode to that a corresponding RRU transmits the downlink carrier signal includes: performing RRU selection decision when the current RRU transmission mode is that a single RRU transmits the downlink carrier signal, and:

when a difference between the current downlink reception level or quality and a first threshold value is greater than or equal to 0, keeping the current RRU transmission mode unchanged; or, when the difference between the current downlink reception level or quality and the first threshold value is less than 0 and an estimated downlink diversity gain incurred by that two adjacent RRUs of the user terminal simultaneously transmit the downlink carrier signal is greater than an absolute value of the difference, selecting the two adjacent RRUs to transmit the downlink carrier signal; or, when the difference between the current downlink reception level or quality and the first threshold value is less than 0 and the estimated downlink diversity gain incurred by that two adjacent RRUs of the user terminal simultaneously transmit the downlink carrier signal is less than or equal to the absolute value of the difference, selecting multiple RRUs among the RRUs to transmit the downlink carrier signal.

With reference to the second possible implementation manner of the third aspect, a third possible implementation manner of the third aspect is further provided, and the processor is further configured to sort uplink reception levels of the RRUs in descending order, and select the first two RRUs as the two adjacent RRUs of the user terminal; and the apparatus further includes a first memory, configured to store correspondence between the estimated downlink diversity gain incurred by that the two adjacent RRUs of the user terminal simultaneously transmit the downlink carrier signal and a spatial distance between the two adjacent RRUs of the user terminal, or, store correspondence between the estimated downlink diversity gain incurred by that the two adjacent RRUs simultaneously transmit the downlink carrier signal and a difference between the uplink reception levels or quality of the two adjacent RRUs of the user terminal.

With reference to the first possible implementation manner of the third aspect, a fourth possible implementation manner of the third aspect is further provided, the performing judgment according to the current downlink reception level or quality and the uplink reception level of each RRU to determine whether to switch from the current RRU transmission mode to that a corresponding RRU transmits the downlink carrier signal includes: performing RRU selection decision when the current RRU transmission mode is that two RRUs transmit the downlink carrier signal, and:

when the current downlink reception level or quality is greater than a second threshold value, selecting an RRU with the greatest uplink reception level among the RRUs to transmit the downlink carrier signal; or, when the current downlink reception level or quality is less than a third threshold value, selecting multiple RRUs among the RRUs to transmit the downlink carrier signal; or, when the current downlink reception level or quality is greater than the third threshold value but less than the second threshold value, keeping the current RRU transmission mode unchanged.

With reference to the first possible implementation manner of the third aspect, a fifth possible implementation manner of the third aspect is further provided, the performing judgment according to the current downlink reception level or quality and the uplink reception level of each RRU to determine whether to switch from the current RRU transmission mode to that a corresponding RRU transmits the downlink carrier signal includes: performing RRU selection decision when the current RRU transmission mode is that multiple RRUs transmit the downlink carrier signal, and:

when the current downlink reception level or quality is greater than a fourth threshold value, selecting an RRU with the greatest uplink reception level among the RRUs to transmit the downlink carrier signal; or, when the current downlink reception level or quality is less than or equal to the fourth threshold value, keeping the current RRU transmission mode unchanged.

As a sixth possible implementation manner of the third aspect, the apparatus further includes a second receiver and a second memory, and the second memory stores power specification of each RRU.

the processor is configured to: determine a current RRU transmission mode; receive the current downlink measurement item of the user terminal and the uplink measurement item of each RRU through the second receiver, where the current downlink measurement item of the user terminal includes a current downlink reception level or quality, and the uplink measurement item of each RRU includes an uplink reception level of each RRU; and perform judgment according to the current downlink measurement item of the user terminal, the uplink measurement item of each RRU, and the power specification of each RRU, so as to determine whether to switch from the current RRU transmission mode to that a corresponding RRU transmits the downlink carrier signal.

With reference to the sixth possible implementation manner of the third aspect, a seventh possible implementation manner of the third aspect is further provided, and the performing judgment according to the current downlink measurement item of the user terminal, the uplink measurement item of each RRU, and the power specification of each RRU to determine whether to switch from the current RRU transmission mode to that a corresponding RRU transmits the downlink carrier signal includes:

when the current RRU transmission mode is that a single RRU transmits a downlink carrier signal, performing RRU selection decision, and if the current downlink reception level or quality reaches a first threshold value, but the uplink reception level of the single RRU is not the greatest one among uplink reception levels of RRUs, performing evaluation according to power specification and uplink path loss of an RRU with the greatest uplink reception level among the RRUs and power specification and uplink path loss of the single RRU that currently transmits the downlink carrier signal, so as to determine whether to select the RRU with the greatest uplink reception level among the RRUs to transmit the downlink carrier signal.

With reference to the sixth possible implementation manner of the third aspect, an eighth possible implementation manner of the third aspect is further provided, and the performing judgment according to the current downlink measurement item of the user terminal, the uplink measurement item of each RRU, and the power specification of each RRU to determine whether to switch from the current RRU transmission mode to that a corresponding RRU transmits the downlink carrier signal includes:

sorting the uplink reception levels of the RRUs in descending order to determine the first two RRUs; and when the current RRU transmission mode is that two RRUs transmit the downlink carrier signal, performing RRU selection decision; if the current downlink reception level or quality is greater than a third threshold value but less than a second threshold value, performing evaluation according to power specification and uplink path loss of the RRU that is among the two RRUs that currently transmit the downlink carrier signal but is not among the first two RRUs ranked in order of the uplink reception level and power specification and uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

With reference to the third aspect or any aforementioned possible implementation manner of the third aspect, a ninth possible implementation manner of the third aspect is further provided, and the processor is further configured to, when the user terminal accesses the current RRU shared cell, keep that each RRU transmits the downlink carrier signal, and when the RRU selection decision cycle arrives, determine, according to the current downlink reception level or quality and the uplink reception level of each RRU, whether to switch from that each RRU transmits the downlink carrier signal to that a single RRU or two RRUs among the RRUs transmit the downlink carrier signal.

With reference to the ninth possible implementation manner of the third aspect, a tenth possible implementation manner of the third aspect is further provided, and the determining, according to the current downlink reception level or quality and the uplink reception level of each RRU, whether to switch from that each RRU transmits the downlink carrier signal to that a single RRU or two RRUs among the RRUs transmit the downlink carrier signal includes:

when the current downlink reception quality reaches a fifth threshold value and the uplink reception levels of at least two RRUs among the RRUs reach a sixth threshold value, selecting the first two RRUs ranked in descending order of the uplink reception level among the at least two RRUs to send the downlink carrier signal; or, when the current downlink reception quality reaches the fifth threshold value, and the uplink reception level of at least one RRU among the RRUs reaches the sixth threshold value, selecting the RRU with the greatest uplink reception level among the at least one RRU to transmit the downlink carrier signal.

With reference to the third aspect or the tenth possible implementation manner of the third aspect, an eleventh possible implementation manner of the third aspect is further provided, and the processor is further configured to configure the current RRU shared cell as a neighboring cell of the current RRU shared cell, so that when a switch decision cycle arrives, a broadcast control channel multi-transmission reception level of the current RRU shared cell is used for participation in switch decision and basic sorting.

Implementation of the embodiments of the present invention has the following beneficial effects. According to a current downlink measurement item of a user terminal and an uplink measurement item of each RRU, or further with reference to power specification of each RRU, it is determined that at least one RRU among the RRUs transmits a downlink carrier signal, so as to timely select a suitable RRU to transmit the downlink carrier signal, realize switching of an RRU transmission mode between single-transmission, dual-transmission, and multi-transmission modes, and decrease probability of RRU multi-transmission or dual-transmission, thereby reducing network interference and RRU power consumption.

BRIEF DESCRIPTION OF DRAWINGS

To make the technical solutions in the embodiments of the present invention more comprehensible, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
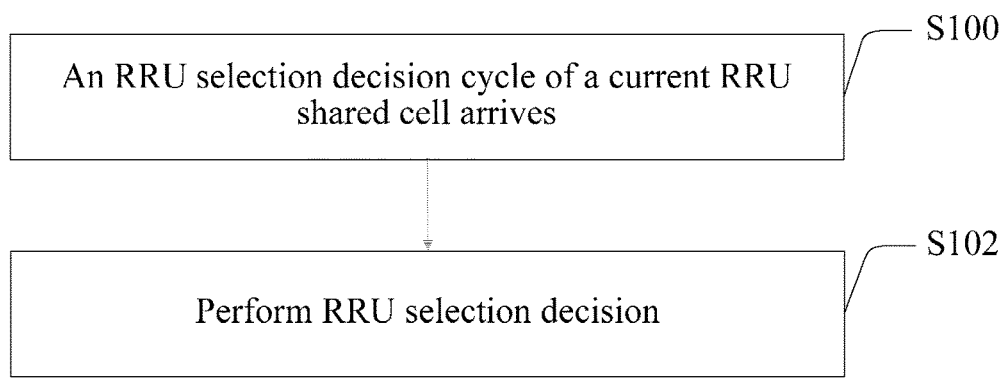
FIG. 1 is a schematic flowchart of a downlink direction RRU selection decision method according to an embodiment of the present invention.

FIG. 1 is a schematic flowchart of a downlink direction RRU selection decision method according to an embodiment of the present invention, and referring to FIG. 1, the method includes the following steps.

S100: An RRU selection decision cycle of a current RRU shared cell arrives.

S102: Perform RRU selection decision. Specifically, according to a current downlink measurement item of a user terminal and an uplink measurement item of each RRU, it is determined that at least one RRU among the RRUs transmits a downlink carrier signal. Alternatively, according to a current downlink measurement item of a user terminal, an uplink measurement item of each RRU, and power specification of each RRU, it is determined that at least one RRU among the RRUs transmits a downlink carrier signal. A downlink channel includes a non-broadcast control channel (Broadcast Control Channel, BCCH for short), for example: a traffic channel (Traffic Channel, TCH for short) and a stand-alone dedicated control channel (Stand-alone Dedicated Control Channel, SDCCH for short).

In an implementation manner of this embodiment, S102 may be implemented by executing the following steps.

Step a: Determine a current RRU transmission mode. The RRU transmission mode includes that a single RRU transmits a downlink carrier signal (that is: single-transmission), two RRUs transmit a downlink carrier signal (that is: dual-transmission), and multiple RRUs transmit a downlink carrier signal (that is: multi-transmission, including the case that all RRUs transmit a downlink carrier signal).

Step b: Perform judgment according to a current downlink reception level or quality and an uplink reception level (or quality) of each RRU, so as to determine whether to switch from the current RRU transmission mode to that a corresponding RRU transmits the downlink carrier signal.

In the implementation manner, RRU selection decision is performed according to the downlink reception level or quality and the uplink reception level (or quality), so as to switch between the multi-transmission, dual-transmission, and single-transmission modes on the basis that signal quality is ensured, thereby reducing network interference and RRU power consumption.

In step b, a specific judgment method depends on the current RRU transmission mode. For example, referring to the schematic flowchart of an RRU selection decision method shown in FIG. 2, the method includes the following steps.

S200: After an RRU selection decision cycle arrives, determine a current RRU transmission mode. If the current RRU transmission mode is single-transmission, execute S202; if the current RRU transmission mode is dual-transmission, execute S204; if the current RRU transmission mode is multi-transmission, execute S206.

S202: Judge whether to switch to corresponding RRU transmission. Alternatively, if the current downlink reception level or quality reaches a first threshold value (for example, a downlink reception quality preset value), the current RRU transmission mode is kept unchanged; if a difference between the current downlink reception level or quality and the first threshold value is less than 0, and an estimated downlink diversity gain incurred by that two adjacent RRUs of a user terminal simultaneously transmit a downlink carrier signal is greater than an absolute value of the difference, the two adjacent RRUs are selected to transmit the downlink carrier signal; if the difference between the current downlink reception level or quality and the first threshold value is less than 0, and an estimated downlink diversity gain incurred by that two adjacent RRUs of a user terminal simultaneously transmit a downlink carrier signal is less than or equal to an absolute value of the difference, multiple RRUs among the RRUs are selected to transmit the downlink carrier signal.

The two adjacent RRUs of the user terminal may be selected in the following manner: The uplink reception levels (or quality) of the RRUs are sorted in descending order, and the first two RRUs are the two adjacent RRUs of the user terminal. In the decision process of switching from single-transmission to dual-transmission (as shown in S202), in the embodiment of the present invention, selection decision is performed with reference to an estimated diversity gain incurred by the two adjacent RRUs of the user terminal that perform dual-transmission. The estimated downlink diversity gain incurred by the two adjacent RRUs that simultaneously transmit the downlink carrier signal corresponds to a distance between the two, or corresponds to a difference in the uplink reception level or quality of the user terminal between the two, and the correspondence may be configured and stored for ease of query and calculation.

S204: Judge whether to switch to corresponding RRU transmission. Alternatively, if the current downlink reception level or quality is greater than a second threshold value (for example, the second threshold value may be the sum of a downlink reception quality threshold and a downlink reception quality threshold hysteresis), the RRU with the greatest uplink reception level among the RRUs is selected to transmit the downlink carrier signal; if the current downlink reception level or quality is less than a third threshold value (for example, the third threshold value may be a downlink reception quality threshold), multiple RRUs among the RRUs are selected to transmit the downlink carrier signal; if the current downlink reception level or quality is greater than the third threshold value but less than the second threshold value, the current RRU transmission mode is kept unchanged.

S206: Judge whether to switch to corresponding RRU transmission. Alternatively, if the current downlink reception level or quality is greater than a fourth threshold value (for example, the fourth threshold value may be a downlink reception quality threshold), the RRU with the greatest uplink reception level among the RRUs is selected to transmit the downlink carrier signal; otherwise, the current RRU transmission mode is kept unchanged.

In another implementation manner of the embodiment, S102 may be implemented in the following manner (step c and step d in the following do not form any sequence with aforementioned step a and step b).

Step c: Determine the current RRU transmission mode.

Step d: Perform judgment according to the current downlink measurement item of the user terminal, the uplink measurement item of each RRU, and the power specification of each RRU, so as to determine whether to switch from the current RRU transmission mode to that the corresponding RRU transmits the downlink carrier signal.

Figure 2:
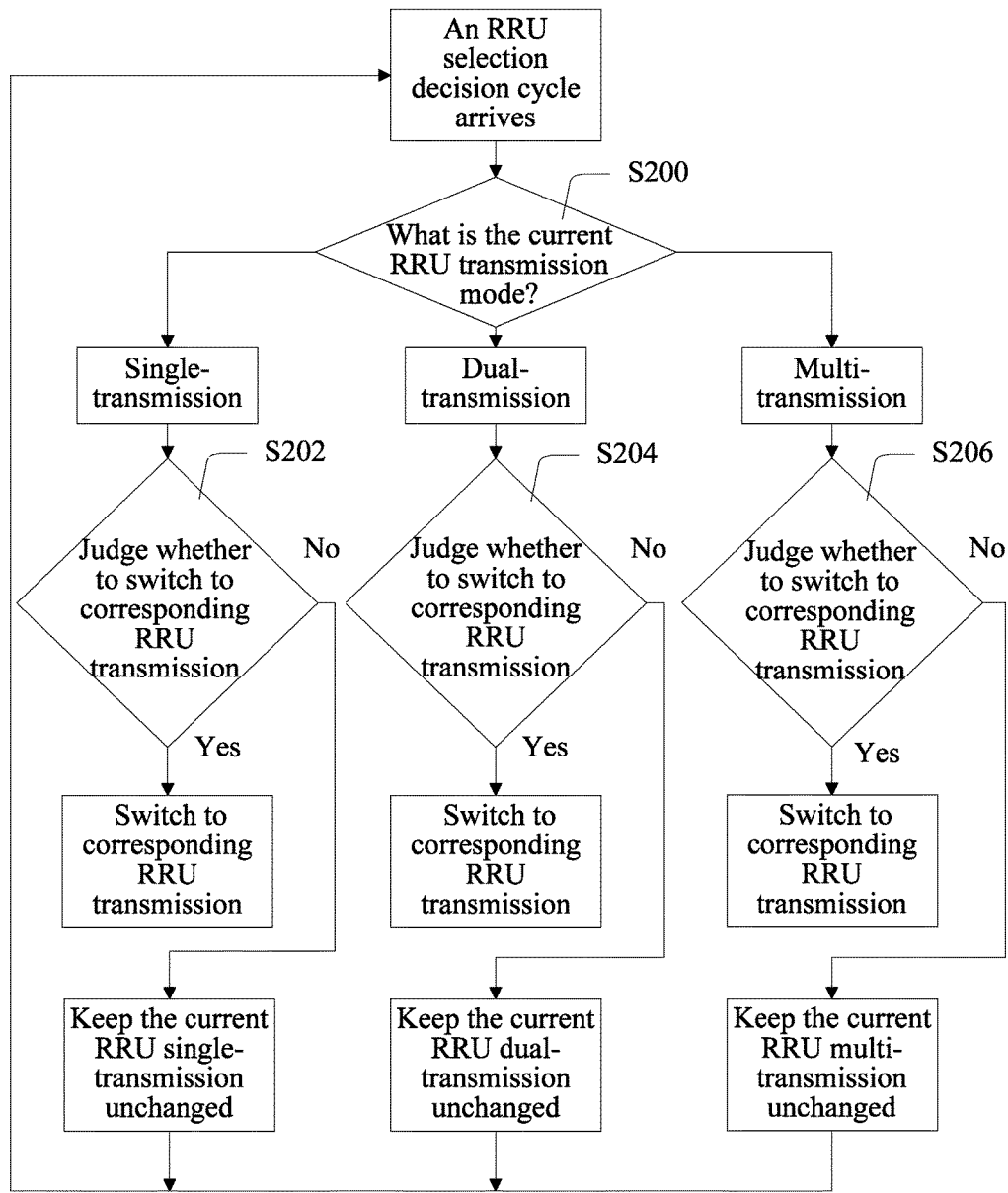
FIG. 2 is a schematic flowchart of a downlink direction RRU selection decision method according to an embodiment of the present invention.

The implementation manner can implement the selection decision methods of the implementation manner shown in FIG. 2, and additionally, can further implement switching from the single-transmission mode to a non-current RRU single-transmission mode, and from a dual-transmission mode to a non-current RRU dual-transmission mode with reference to the power specification of each RRU. A single RRU or two RRUs with best signal quality can be selected to act as a serving RRU or serving RRUs.

Figure 3:
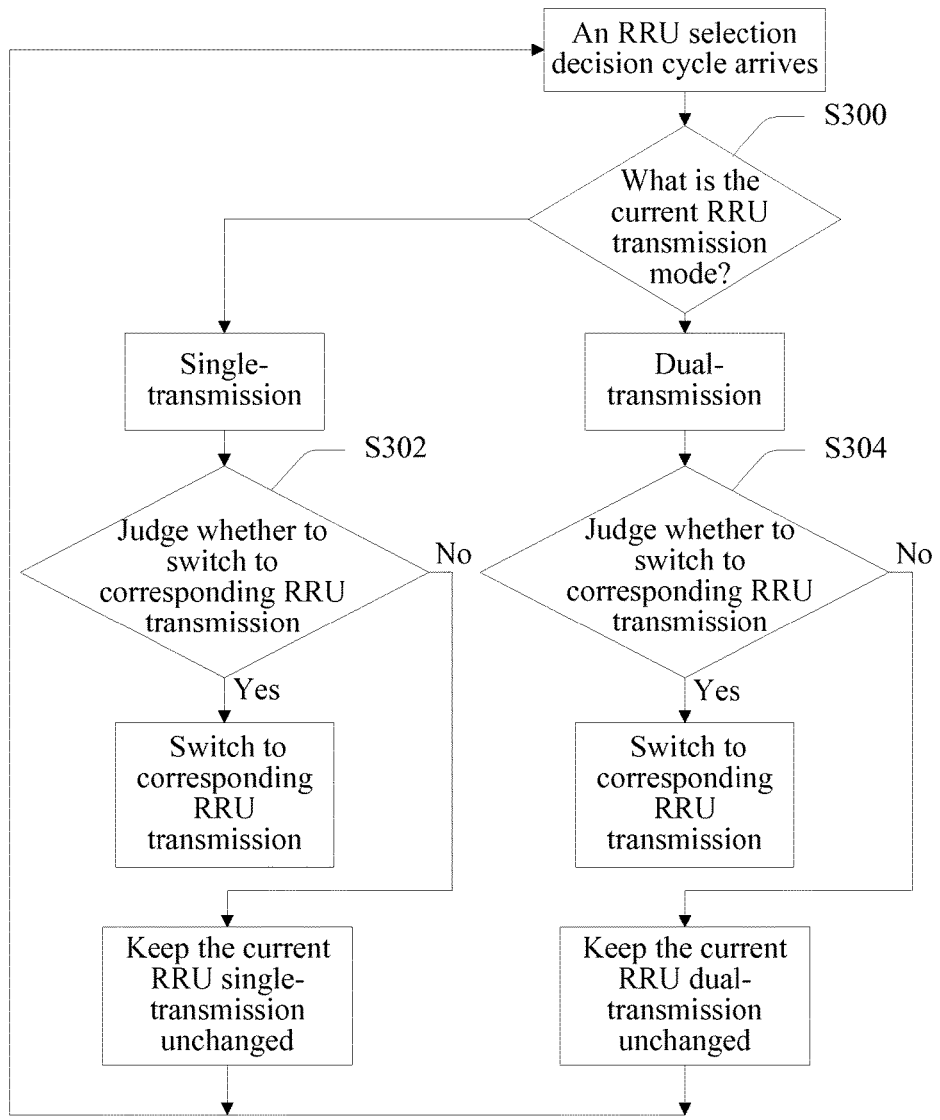
FIG. 3 is a schematic flowchart of a downlink direction RRU selection decision method according to an embodiment of the present invention.

In step d, a specific judgment method depends on the current RRU transmission mode. For example, referring to the schematic flowchart of an RRU selection decision method shown in FIG. 3, the method includes the following steps.

S300: After an RRU selection decision cycle arrives, determine a current RRU transmission mode. If the current RRU transmission mode is single-transmission, execute S302 (obviously, S202 may also be executed, which is not described here again); if the current RRU transmission mode is dual-transmission, execute S304 (obviously, S204 may also be executed, which is not described here again).

S302: Judge whether to switch to corresponding RRU transmission. If a current downlink reception level or quality reaches a first threshold value, but an uplink reception level of a single RRU that currently transmits a downlink carrier signal is not the greatest one among uplink reception levels of the RRUs, evaluation is performed according to power specification and uplink path loss of an RRU with the greatest uplink reception level among the RRUs and power specification and uplink path loss of the single RRU that currently transmits the downlink carrier signal, so as to determine whether to select the RRU with the greatest uplink reception level among the RRUs to transmit the downlink carrier signal.

For example, it is assumed that Step_k is a power control decrease of a previous decision cycle of RRU_k; Rxlev_UL_k is an uplink reception level of RRU_k; RRU_k_pmax is maximum transmission power of RRU_k; P_MS is current transmission power of a mobile phone, where k=1, 2, 3, 4, 5, 6 . . . .

According to the aforementioned set values, it is assumed that RRU_1 is an RRU currently executing single-transmission, and RRU_2 is a target for pre-switching. Based on that uplink and downlink path loss is balanced and before and after switching, downlink interference of a user terminal is not changed, if the following condition is met, it may be switched from current single-transmission of RRU_1 to that RRU2 performs single-transmission:

$$RRU\_2\_pmax - (P\_MS - Rxlev\_UL\_2) \geq (RRU\_1\_pmax - Step\_1) - (P\_MS - Rxlev\_UL\_1).$$

S304: Judge whether to switch to corresponding RRU transmission. When the current downlink reception level or quality is greater than the third threshold value but less than the second threshold value, the uplink reception levels of the RRUs are sorted in descending order to determine the first two RRUs. If at least one of the two RRUs that currently transmit the downlink carrier signal is not among the first two RRUs, evaluation is performed according to the power specification and the uplink path loss of the RRU that is among the two RRUs that currently transmit the downlink carrier signal but is not among the first two RRUs ranked in order of the uplink reception level and the power specification and the uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

For example, it is assumed that RRU_1 and RRU_2 are RRUs that currently execute dual-transmission, and RRU_2 and RRU_3 are the first two RRUs among the RRUs sorted in descending order regarding the uplink reception level. In this case, evaluation may be performed according to the respective power specification and uplink path loss of RRU_3 and RRU_1, so as to determine whether to switch to RRU_2 and RRU_3 to perform dual-transmission. A condition for determination of the switching may be:

$$(RRU\_3\_pmax - RRU\_2\_pmax + Step\_2) + (Rxlev\_UL\_3 - Rxlev\_UL\_2) \geq 0.$$

For another example, it is assumed that RRU_1 and RRU_2 are RRUs that currently execute dual-transmission, and RRU_3 and RRU_4 are the first two RRUs among the RRUs sorted in descending order regarding the uplink reception level. In this case, evaluation may be performed according to the respective power specification and uplink path loss of RRU_1, RRU_2, RRU_3, and RRU_4, so as to determine whether to switch to RRU_3 and RRU_4 to perform dual-transmission. A condition for determination of the switching may be: among the following conditions, (1) and (4) are met at the same time, or (2) and (3) are met at the same time:

$$(RRU\_3\_pmax - RRU\_1\_pmax + Step\_1) + (Rxlev\_UL\_3 - Rxlev\_UL\_1) \geq 0 \quad (1)$$

$$(RRU\_3\_pmax - RRU\_2\_pmax + Step\_2) + (Rxlev\_UL\_3 - Rxlev\_UL\_2) \geq 0 \quad (2)$$

$$(RRU\_4\_pmax - RRU\_1\_pmax + Step\_1) + (Rxlev\_UL\_4 - Rxlev\_UL\_1) \geq 0 \quad (3)$$

$$(RRU\_4\_pmax - RRU\_2\_pmax + Step\_2) + (Rxlev\_UL\_4 - Rxlev\_UL\_2) \geq 0 \quad (4)$$

Figure 4:
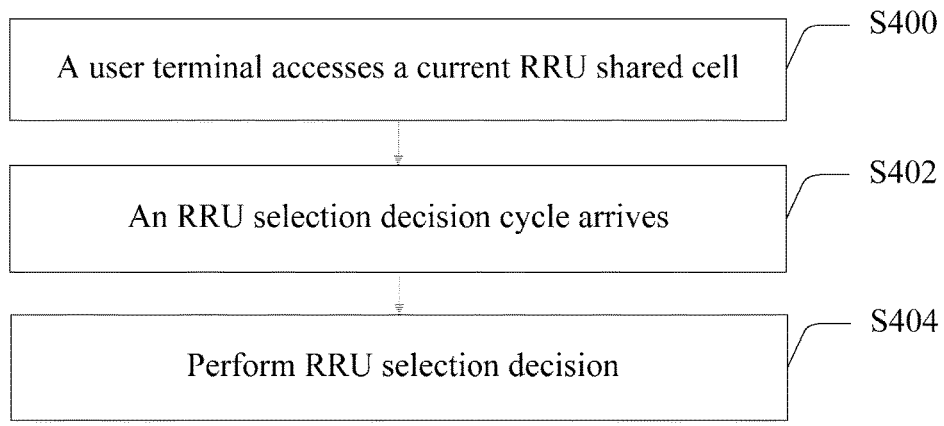
FIG. 4 is a schematic flowchart of a downlink direction RRU selection decision method according to an embodiment of the present invention.

FIG. 4 is a schematic flowchart of a downlink direction RRU selection decision method according to an embodiment of the present invention, and referring to FIG. 4, the method includes the following steps.

S400: A user terminal accesses (including initial access and entering by being handed over from a neighboring cell) a current RRU shared cell.

S402: An RRU selection decision cycle arrives.

S404: Perform RRU selection decision. The above description of S102 may be referred to for description of this step, which is not repeated herein.

In an implementation manner of this embodiment, S400 may be implemented through the following steps (it should be noted that, steps a and b, steps c and d, and steps e and f appearing in the specification are for illustrating respective corresponding content in different implementation manners respectively, and steps a to f do not form any customary sequential relationship):

Step e): Keep that each RRU transmits a downlink carrier signal. Step f): When the RRU selection decision cycle arrives, determine, according to an uplink reception level (or quality) of each RRU and a current downlink reception level (or quality), whether to switch from that each RRU transmits the downlink carrier signal to that a single RRU or two RRUs among the RRUs transmit the downlink carrier signal, for example:

if current downlink reception quality reaches a fifth threshold value, and the uplink reception level of at least two RRUs among the RRUs reaches a sixth threshold value, two RRUs, which are the first two after sorting is performed according to the uplink reception level in descending order, are selected from the at least two RRUs to send the downlink carrier signal; if the current downlink reception quality reaches the fifth threshold value, and the uplink reception level of at least one RRU among the RRUs reaches the sixth threshold value, the RRU with the greatest uplink reception level among the at least one RRU is selected to transmit the downlink carrier signal, where the fifth threshold value may be the sum of a downlink reception quality threshold and an RRU downlink multi-transmission quality hysteresis, and the sixth threshold value may be an uplink level access threshold value.

In the embodiments shown by FIG. 1 to FIG. 4, each threshold value is a preset value, which is not limited by the present invention.

Figure 5:
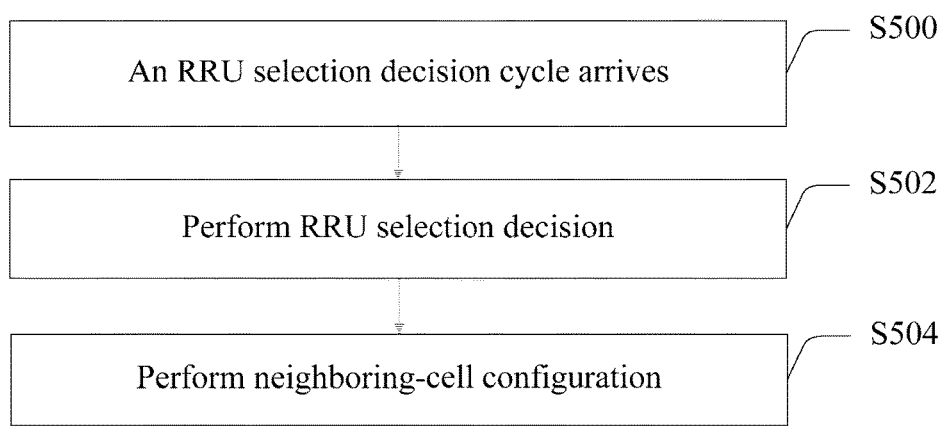
FIG. 5 is a schematic flowchart of a downlink direction RRU selection decision method according to an embodiment of the present invention.

FIG. 5 is a schematic flowchart of a downlink direction RRU selection decision method according to an embodiment of the present invention, and referring to FIG. 5, the method includes the following steps.

S500: An RRU selection decision cycle arrives.

S502: Perform RRU selection decision. The above description of S102 may be referred to for description of this step, which is not repeated herein.

S504: Perform neighboring-cell configuration. Specifically, a current RRU shared cell configures itself as its neighboring cell, so that when a switch decision cycle arrives, a broadcast control channel multi-transmission reception level of the current RRU shared cell is used for participation in switch decision and basic sorting.

Obviously, before S500, S400 may also be executed to make a user terminal access the current RRU shared cell.

This embodiment can avoid the problem of ping-pong handover. For example, after a user is handed over from RRU_1 to RRU_2 (switching from a multi-transmission mode to a single-transmission/dual-transmission mode), and when it is measured that a broadcast control channel multi-transmission level of RRU_1 is greater than a non-broadcast control channel single/dual-transmission level of RRU_2, handover from RRU_2 back to RRU_1 is avoided.

Figure 6A:
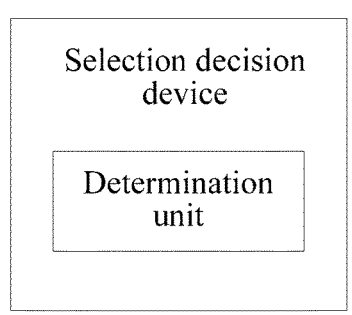
FIG. 6A is a schematic structural diagram of a downlink direction RRU selection decision apparatus according to an embodiment of the present invention.

FIG. 6A is a schematic structural diagram of a downlink direction RRU selection decision apparatus according to an embodiment of the present invention, and the selection decision apparatus includes:

a determination unit, configured to, when an RRU selection decision cycle of a current RRU shared cell arrives, determine, according to a current downlink measurement item of a user terminal and an uplink measurement item of each RRU, that at least one RRU among the RRUs transmits a downlink carrier signal; or, determine, according to the current downlink measurement item of the user terminal, the uplink measurement item of each RRU, and power specification of each RRU, that at least one RRU among the RRUs transmits a downlink carrier signal, where a downlink channel includes: a traffic channel and a stand-alone dedicated control channel.

Figure 6B:
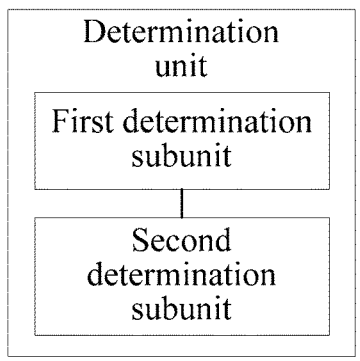
FIG. 6B is a schematic structural diagram of a determination unit of a downlink direction RRU selection decision apparatus according to an embodiment of the present invention.

In an implementation manner of this embodiment, referring to FIG. 6B, the determination unit may include:

a first determination subunit, configured to determine a current RRU transmission mode; and a second determination subunit, configured to perform judgment according to a current downlink reception level or quality and an uplink reception level (or quality) of each RRU, so as to determine whether to switch from the current RRU transmission mode to that a corresponding RRU transmits the downlink carrier signal.

In the implementation manner, RRU selection decision may be performed according to the downlink reception level or quality and the uplink reception level (or quality), so as to switch between the multi-transmission, dual-transmission, and single-transmission modes on the basis that signal quality is ensured, thereby reducing network interference and RRU power consumption.

Figure 7:
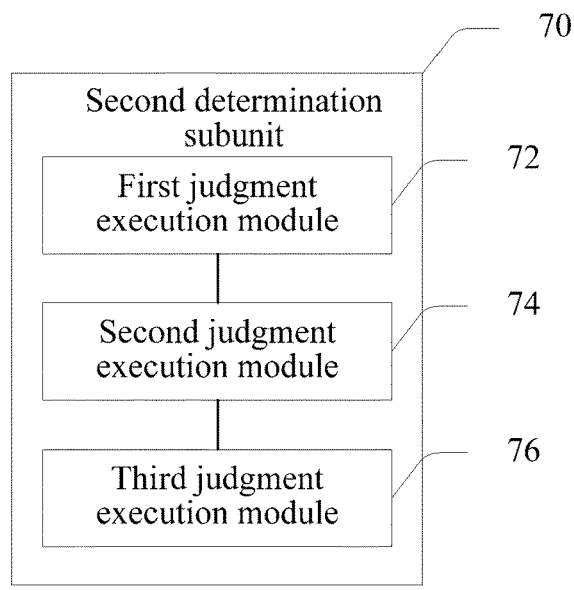
FIG. 7 is a schematic structural diagram of a second determination subunit of a downlink direction RRU selection decision apparatus according to an embodiment of the present invention.

For a schematic structural diagram of the second determination subunit, reference may be made to FIG. 7.

Figure 6C:
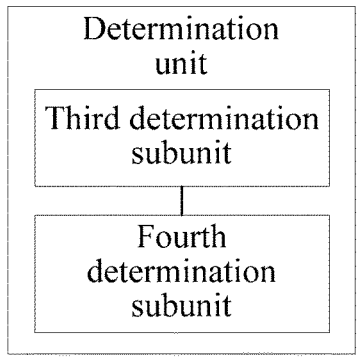
FIG. 6C is a schematic structural diagram of a determination unit of a downlink direction RRU selection decision apparatus according to an embodiment of the present invention.

In another implementation manner of this embodiment, referring to FIG. 6C, the determination unit may include:

a third determination subunit, configured to determine the current RRU transmission mode; and a fourth determination subunit, configured to perform judgment according to the current downlink measurement item of the user terminal, the uplink measurement item of each RRU, and the power specification of each RRU, so as to determine whether to switch from the current RRU transmission mode to that a corresponding RRU transmits the downlink carrier signal.

The implementation manner can implement the functions of the implementation manner shown in FIG. 6B, and additionally, can further implement switching from the single-transmission mode to a non-current RRU single-transmission mode, and from a dual-transmission mode to a non-current RRU dual-transmission mode with reference to the power specification of each RRU. A single RRU or two RRUs with best signal quality can be selected to act as a serving RRU or serving RRUs.

Figure 8:
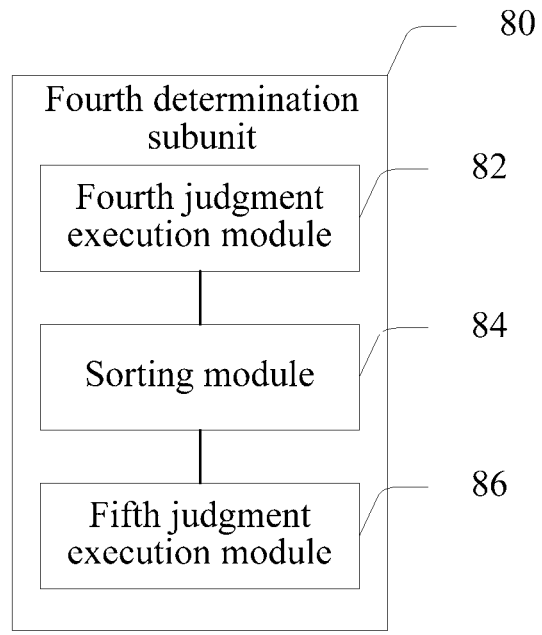
FIG. 8 is a schematic structural diagram of a fourth determination subunit of a downlink direction RRU selection decision apparatus according to an embodiment of the present invention.

For a schematic structural diagram of the fourth determination subunit, reference may be made to FIG. 8.

FIG. 7 is a schematic structural diagram of a second determination subunit of a downlink direction RRU selection decision apparatus according to an embodiment of the present invention, and referring to FIG. 7, the second determination subunit 70 includes:

a first judgment execution module 72, configured to, when the current RRU transmission mode is that a single RRU transmits the downlink carrier signal, perform RRU selection decision, where alternatively, the first judgment execution module 72 may be configured to, when a difference between the current downlink reception level or quality and a first threshold value is greater than or equal to 0, keep the current RRU transmission mode unchanged; when the difference between the current downlink reception level or quality and the first threshold value is less than 0 and an estimated downlink diversity gain incurred by that two adjacent RRUs of the user terminal simultaneously transmit the downlink carrier signal is greater than an absolute value of the difference, select the two adjacent RRUs to transmit the downlink carrier signal; when the difference between the current downlink reception level or quality and the first threshold value is less than 0 and the estimated downlink diversity gain incurred by that two adjacent RRUs of the user terminal simultaneously transmit the downlink carrier signal is less than or equal to the absolute value of the difference, select multiple RRUs among the RRUs to transmit the downlink carrier signal;

a second judgment execution module 74, configured to, when the current RRU transmission mode is that two RRUs transmit the downlink carrier signal, perform RRU selection decision, where alternatively, the second judgment execution module 74 may be configured to: when the current downlink reception level or quality is greater than a second threshold value, select an RRU with the greatest uplink reception level among the RRUs to transmit the downlink carrier signal; when the current downlink reception level or quality is less than a third threshold value, select multiple RRUs among the RRUs to transmit the downlink carrier signal; when the current downlink reception level or quality is greater than the third threshold value but less than the second threshold value, keep the current RRU transmission mode unchanged; and a third judgment execution module 76, configured to, when the current RRU transmission mode is that multiple RRUs transmit the downlink carrier signal, perform RRU selection decision, where alternatively, the third judgment execution module 76 may be configured to: when the current downlink reception level or quality is greater than a fourth threshold value, select an RRU with the greatest uplink reception level among the RRUs to transmit the downlink carrier signal; when the current downlink reception level or quality is less than or equal to the fourth threshold value, keep the current RRU transmission mode unchanged.

In an implementation manner of this embodiment, the second determination subunit 70 may further include the following modules, so that the first judgment execution module 72 performs query and calculation on related values:

a selection module, configured to sort uplink reception levels of the RRUs in descending order, and select the first two RRUs as two adjacent RRUs of the user terminal;

a storage module, configured to store correspondence between the estimated downlink diversity gain incurred by that the two adjacent RRUs of the user terminal simultaneously transmit the downlink carrier signal and a spatial distance between the two adjacent RRUs of the user terminal; or, store correspondence between the estimated downlink diversity gain incurred by that the two adjacent RRUs of the user terminal simultaneously transmit the downlink carrier signal and a difference between the uplink reception levels or quality of the two adjacent RRUs of the user terminal.

Definitely, in another implementation manner of this embodiment, the second determination subunit 70 may also include any one or two of the first judgment execution module 72, the second judgment execution module 74, and the third judgment execution module 76.

FIG. 8 is a schematic structural diagram of a fourth determination subunit of a downlink direction RRU selection decision apparatus according to an embodiment of the present invention, and referring to FIG. 8, the fourth determination subunit 80 includes:

a fourth judgment execution module 82, configured to, when a current RRU transmission mode is that a single RRU transmits a downlink carrier signal, perform RRU selection decision, and if a current downlink reception level or quality reaches a first threshold value, but an uplink reception level of the single RRU is not the greatest one among uplink reception levels of RRUs, perform evaluation according to power specification and uplink path loss of an RRU with the greatest uplink reception level among the RRUs and power specification and uplink path loss of the single RRU that currently transmits the downlink carrier signal, so as to determine whether to select the RRU with the greatest uplink reception level among the RRUs to transmit the downlink carrier signal;

a sorting module 84, configured to sort the uplink reception levels of the RRUs in descending order, so as to determine the first two RRUs or determine the RRU with the greatest uplink reception level; and a fifth judgment execution module 86, configured to, when the current RRU transmission mode is that two RRUs transmit the downlink carrier signal, perform RRU selection decision, and if the current downlink reception level or quality is greater than a third threshold value but less than a second threshold value, perform evaluation according to the power specification and the uplink path loss of the RRU that is among the two RRUs that currently transmit the downlink carrier signal but is not among the first two RRUs ranked in order of the uplink reception level and the power specification and the uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

Figure 9:
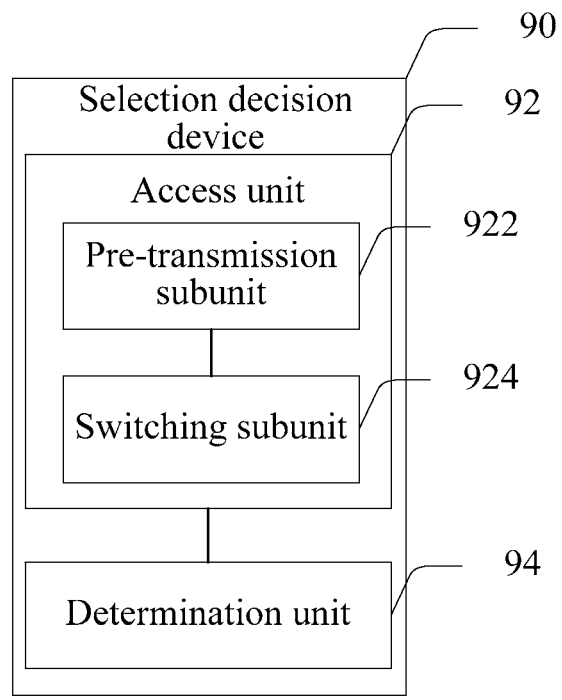
FIG. 9 is a schematic structural diagram of a downlink direction RRU selection decision apparatus according to an embodiment of the present invention.

FIG. 9 is a schematic structural diagram of a downlink direction RRU selection decision apparatus according to an embodiment of the present invention, and referring to FIG. 9, a selection decision apparatus 90 includes:

an access unit 92, configured to make a user terminal access a current RRU shared cell; and a determination unit 94, where the above description of the determination unit in the embodiments shown in FIG. 6A, FIG. 6B, and FIG. 6C may be referred to for description of the determination unit 94, which is not repeated herein.

The access unit 92 may include:

a pre-transmission subunit 922, configured to keep that each RRU transmits a downlink carrier signal;

a switching subunit 924, configured to, when an RRU selection decision cycle arrives, determine, according to a current downlink reception level or quality and an uplink reception level of each RRU, whether to switch from that each RRU transmits the downlink carrier signal to that a single RRU or two RRUs among the RRUs transmit the downlink carrier signal; where for example, the switching subunit 924 may include:

a first switching module, configured to, when the current downlink reception quality reaches a fifth threshold value and the uplink reception levels of at least two RRUs among the RRUs reach a sixth threshold value, select the first two RRUs ranked in descending order of the uplink reception level among the at least two RRUs to send the downlink carrier signal; and a second switching module, configured to, when the current downlink reception quality reaches the fifth threshold value and the uplink reception level of at least one RRU among the RRUs reaches the sixth threshold value, select the RRU with the greatest uplink reception level among the at least one RRU to transmit the downlink carrier signal.

Figure 10:
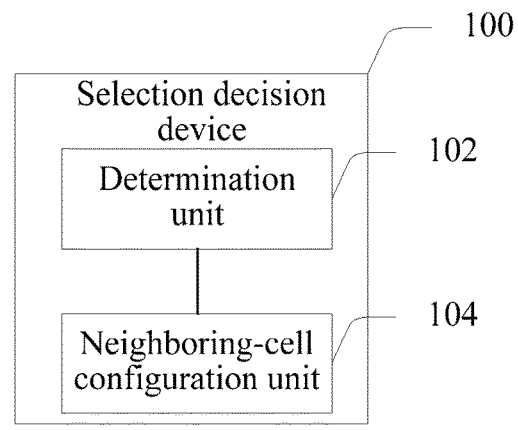
FIG. 10 is a schematic structural diagram of a downlink direction RRU selection decision apparatus according to an embodiment of the present invention.

FIG. 10 is a schematic structural diagram of a downlink direction RRU selection decision apparatus according to an embodiment of the present invention, and referring to FIG. 10, a selection decision apparatus 100 includes:

a determination unit 102, where the above description of the determination unit in FIG. 6A, FIG. 6B, and FIG. 6C may be referred to for description of the determination unit 102, which is not repeated herein; and a neighboring-cell configuration unit 104, configured to configure a current RRU shared cell as a neighboring cell of the current RRU shared cell, so that when a switch decision cycle arrives, a broadcast control channel multi-transmission reception level of the current RRU shared cell is used for participation in switch decision and basic sorting.

This embodiment can avoid the problem of ping-pong handover. For example, after a user is handed over from RRU_1 to RRU_2 (switching from a multi-transmission mode to a single-transmission/dual-transmission mode), and when it is measured that a broadcast control channel multi-transmission level of RRU_1 is greater than a non-broadcast control channel single/dual-transmission level of RRU_2, handover from RRU_2 back to RRU_1 is avoided.

In an implementation manner of this embodiment, the selection decision apparatus 100 may further have an access unit configured to make a user terminal access the current RRU shared cell (for example the aforementioned access unit 92).

Figure 11:
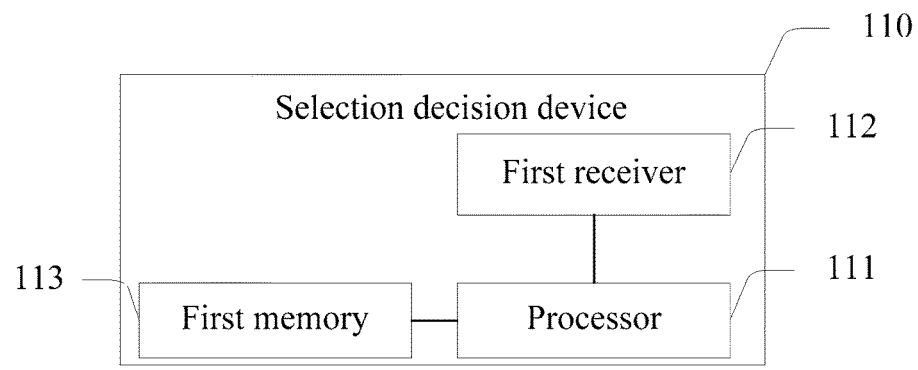
FIG. 11 is a schematic structural diagram of a downlink direction RRU selection decision apparatus according to an embodiment of the present invention.

FIG. 11 is a schematic structural diagram of a downlink direction RRU selection decision apparatus according to an embodiment of the present invention, and a selection decision apparatus 110 includes: a processor 111, configured to:

when an RRU selection decision cycle of a current RRU shared cell arrives, determine, according to a current downlink measurement item of a user terminal and an uplink measurement item of each RRU, that at least one RRU among the RRUs transmits a downlink carrier signal; or, determine, according to the current downlink measurement item of the user terminal, the uplink measurement item of each RRU, and power specification of each RRU, that at least one RRU among the RRUs transmits a downlink carrier signal, where a downlink channel includes: a traffic channel and a stand-alone dedicated control channel.

Alternatively, in an implementation manner of this embodiment, the selection decision apparatus 110 further includes a first receiver 112, and the processor 111 is configured to execute the following operations.

1) Determine a current RRU transmission mode. 2) Receive the current downlink measurement item of the user terminal and the uplink measurement item of each RRU through the first receiver 112, where the current downlink measurement item of the user terminal includes a current downlink reception level or quality, and the uplink measurement item of each RRU includes an uplink reception level of each RRU. 3) Perform judgment according to the current downlink reception level or quality and the uplink reception level of each RRU, so as to determine whether to switch from the current RRU transmission mode to that a corresponding RRU transmits the downlink carrier signal. Further alternatively, the operation 3) may be implemented in the following manners.

Manner 1): Perform RRU selection decision when the current RRU transmission mode is that a single RRU transmits the downlink carrier signal, and:

when a difference between the current downlink reception level or quality and a first threshold value is greater than or equal to 0, keep the current RRU transmission mode unchanged; or, when the difference between the current downlink reception level or quality and the first threshold value is less than 0 and an estimated downlink diversity gain incurred by that two adjacent RRUs of the user terminal simultaneously transmit the downlink carrier signal is greater than an absolute value of the difference, select the two adjacent RRUs to transmit the downlink carrier signal; or, when the difference between the current downlink reception level or quality and the first threshold value is less than 0 and the estimated downlink diversity gain incurred by that two adjacent RRUs of the user terminal simultaneously transmit the downlink carrier signal is less than or equal to the absolute value of the difference, select multiple RRUs among the RRUs to transmit the downlink carrier signal.

In Manner 1, the processor 111 is further configured to sort uplink reception levels of the RRUs in descending order, and select the first two RRUs as the two adjacent RRUs of the user terminal. The selection decision apparatus 110 further includes a first memory 113, configured to store correspondence between the estimated downlink diversity gain incurred by that the two adjacent RRUs of the user terminal simultaneously transmit the downlink carrier signal and a spatial distance between the two adjacent RRUs of the user terminal; or, store correspondence between the estimated downlink diversity gain incurred by that the two adjacent RRUs simultaneously transmit the downlink carrier signal and a difference between the uplink reception levels or quality of the two adjacent RRUs of the user terminal.

Manner 2): Perform RRU selection decision when the current RRU transmission mode is that two RRUs transmit the downlink carrier signal, and:

when the current downlink reception level or quality is greater than a second threshold value, select an RRU with the greatest uplink reception level among the RRUs to transmit the downlink carrier signal; or, when the current downlink reception level or quality is less than a third threshold value, select multiple RRUs among the RRUs to transmit the downlink carrier signal; or, when the current downlink reception level or quality is greater than the third threshold value but less than the second threshold value, keep the current RRU transmission mode unchanged.

Manner 3): Perform RRU selection decision when the current RRU transmission mode is that multiple RRUs transmit the downlink carrier signal, and:

when the current downlink reception level or quality is greater than a fourth threshold value, select an RRU with the greatest uplink reception level among the RRUs to transmit the downlink carrier signal; or, when the current downlink reception level or quality is less than or equal to the fourth threshold value, keep the current RRU transmission mode unchanged.

For detailed illustration of the aforementioned three manners, reference may be made to illustration in corresponding embodiments of method, which is not repeated herein.

Alternatively, in an implementation manner of this embodiment, the processor 111 is further configured to, when the user terminal accesses the current RRU shared cell, keep that each RRU transmits the downlink carrier signal, and when the RRU selection decision cycle arrives, determine, according to the current downlink reception level or quality and the uplink reception level of each RRU, whether to switch from that each RRU transmits the downlink carrier signal to that a single RRU or two RRUs among the RRUs transmit the downlink carrier signal. Further alternatively, when the current downlink reception quality reaches a fifth threshold value and the uplink reception levels of at least two RRUs among the RRUs reach a sixth threshold value, the first two RRUs ranked in descending order of the uplink reception level among the at least two RRUs are selected to send the downlink carrier signal; or, when the current downlink reception quality reaches the fifth threshold value, and the uplink reception level of at least one RRU among the RRUs reaches the sixth threshold value, the RRU with the greatest uplink reception level among the at least one RRU is selected to transmit the downlink carrier signal.

Alternatively, in an implementation manner of this embodiment, the processor 111 is further configured to configure a current RRU shared cell as a neighboring cell of the current RRU shared cell, so that when a switch decision cycle arrives, a broadcast control channel multi-transmission reception level of the current RRU shared cell is used for participation in switch decision and basic sorting.

Figure 12:
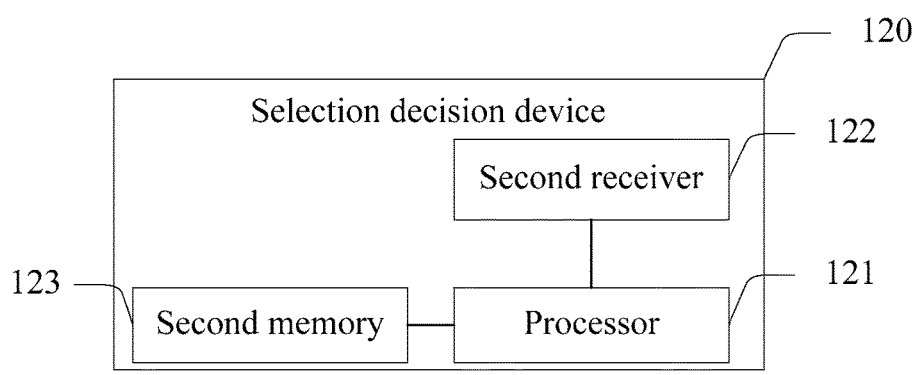
FIG. 12 is a schematic structural diagram of a downlink direction RRU selection decision apparatus according to an embodiment of the present invention.

FIG. 12 is a schematic structural diagram of a downlink direction RRU selection decision apparatus according to an embodiment of the present invention, and a selection decision apparatus 120 includes: a processor 121, configured to, when an RRU selection decision cycle of a current RRU shared cell arrives, determine, according to a current downlink measurement item of a user terminal and an uplink measurement item of each RRU, that at least one RRU among the RRUs transmits a downlink carrier signal; or, determine, according to the current downlink measurement item of the user terminal, the uplink measurement item of each RRU, and power specification of each RRU, that at least one RRU among the RRUs transmits a downlink carrier signal, where a downlink channel includes: a traffic channel and a stand-alone dedicated control channel.

Alternatively, in an implementation manner of this embodiment, the selection decision apparatus 120 further includes a second receiver 122 and a second memory 123. The second memory 123 stores the power specification of each RRU. The processor 121 is configured to execute the following operations.

1) Determine a current RRU transmission mode. 2) Receive the current downlink measurement item of the user terminal and the uplink measurement item of each RRU through the second receiver, where the current downlink measurement item of the user terminal includes a current downlink reception level or quality, and the uplink measurement item of each RRU includes an uplink reception level of each RRU. 3) Perform judgment according to the current downlink measurement item of the user terminal, the uplink measurement item of each RRU, and the power specification of each RRU, so as to determine whether to switch from the current RRU transmission mode to that a corresponding RRU transmits the downlink carrier signal. Further alternatively, the operation 3) may be implemented in the following manners.

Manner 1): when a current RRU transmission mode is that a single RRU transmits a downlink carrier signal, perform RRU selection decision, and if a current downlink reception level or quality reaches a first threshold value, but an uplink reception level of the single RRU is not the greatest one among uplink reception levels of RRUs, perform evaluation according to power specification and uplink path loss of an RRU with the greatest uplink reception level among the RRUs and power specification and uplink path loss of the single RRU that currently transmits the downlink carrier signal, so as to determine whether to select the RRU with the greatest uplink reception level among the RRUs to transmit the downlink carrier signal.

Manner 2): Sort the uplink reception levels of the RRUs in descending order to determine the first two RRUs; when the current RRU transmission mode is that two RRUs transmit the downlink carrier signal, perform RRU selection decision; if the current downlink reception level or quality is greater than a third threshold value but less than a second threshold value, perform evaluation according to power specification and uplink path loss of the RRU that is among the two RRUs that currently transmit the downlink carrier signal but is not among the first two RRUs ranked in order of the uplink reception level and power specification and uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

Alternatively, in an implementation manner of this embodiment, the processor 121 is further configured to, when the user terminal accesses the current RRU shared cell, keep that each RRU transmits the downlink carrier signal, and when the RRU selection decision cycle arrives, determine, according to the current downlink reception level or quality and the uplink reception level of each RRU, whether to switch from that each RRU transmits the downlink carrier signal to that a single RRU or two RRUs among the RRUs transmit the downlink carrier signal. Further alternatively, when the current downlink reception quality reaches a fifth threshold value and the uplink reception levels of at least two RRUs among the RRUs reach a sixth threshold value, the first two RRUs ranked in descending order of the uplink reception level among the at least two RRUs are selected to send the downlink carrier signal; or, when the current downlink reception quality reaches the fifth threshold value, and the uplink reception level of at least one RRU among the RRUs reaches the sixth threshold value, the RRU with the greatest uplink reception level among the at least one RRU is selected to transmit the downlink carrier signal.

Alternatively, in an implementation manner of this embodiment, the processor 121 is further configured to configure a current RRU shared cell as a neighboring cell of the current RRU shared cell, so that when a switch decision cycle arrives, a broadcast control channel multi-transmission reception level of the current RRU shared cell is used for participation in switch decision and basic sorting.

The present invention further provides a downlink direction RRU selection decision apparatus, and the apparatus has the components and functions of the apparatus shown in FIG. 11 and FIG. 12, which is not described herein again.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a read-only memory (Read-Only Memory, ROM), a random access memory (Random Access Memory, RAM), and the like.

The above descriptions are merely exemplary embodiments of the present invention, and the scope of the present invention is not limited thereby. Equivalent modifications made according to the claims shall also fall within the scope of the present invention.

What is claimed is:

1. A downlink direction remote radio unit (RRU) selection decision method comprising:
   acquiring a signal indicating an arrival of an RRU selection decision cycle of a current RRU shared cell, the RRU shared cell comprising two or more RRUs;
   determining that at least one RRU among the two or more RRUs transmits a downlink carrier signal,
   i. according to a current downlink reception level or quality of a user terminal and an uplink reception level or quality of each RRU; or
   ii. according to the current downlink reception level or quality of the user terminal, the uplink reception level or quality of each RRU, and power specification of each RRU,
   wherein a downlink channel comprises a traffic channel and a stand-alone dedicated control channel; and
   determining a current RRU transmission mode based on a number of the at least one RRU among the two or more RRUs that transmits the download carrier signal.

2. The method according to claim 1, wherein determining that at least one RRU among the two or more RRUs transmits the downlink carrier signal according to the current downlink reception level or quality of the user terminal and the uplink reception level or quality of each RRU, further comprises:
   performing judgment according to the current downlink reception level or quality and the uplink reception level of each RRU, so as to determine whether to switch from the current RRU transmission mode to that a corresponding RRU transmits the downlink carrier signal.

3. The method according to claim 2, wherein performing judgment comprises:
   when the current RRU transmission mode is that a single RRU transmits the downlink carrier signal:
   if the current downlink reception level or quality reaches a first threshold value, keeping the current RRU transmission mode unchanged; or
   if a difference between the current downlink reception level or quality and the first threshold value is less than 0, and an estimated downlink diversity gain incurred by that two adjacent RRUs of a user terminal simultaneously transmit the downlink carrier signal is greater than an absolute value of the difference, selecting the two adjacent RRUs to transmit the downlink carrier signal; or
   if the difference between the current downlink reception level or quality and the first threshold value is less than 0, and the estimated downlink diversity gain incurred by that the two adjacent RRUs of the user terminal simultaneously transmit the downlink carrier signal is less than or equal to the absolute value of the difference, selecting multiple RRUs among the two or more RRUs to transmit the downlink carrier signal.

4. The method according to claim 3, wherein the uplink reception levels of the RRUs are sorted in descending order, the first two RRUs are the two adjacent RRUs of the user terminal, the estimated downlink diversity gain incurred by that the two simultaneously transmit the downlink carrier signal corresponds to a spatial distance between the two, or corresponds to a difference between the uplink reception levels of the two.

5. The method according to claim 2, wherein performing judgement comprises:
   when the current RRU transmission mode is that two RRUs transmit the downlink carrier signal:
   if the current downlink reception level or quality is greater than a second threshold value, selecting an RRU with the greatest uplink reception level among the two or more RRUs to transmit the downlink carrier signal; or
   if the current downlink reception level or quality is less than a third threshold value, selecting multiple RRUs among the two or more RRUs to transmit the downlink carrier signal; or
   if the current downlink reception level or quality is greater than the third threshold value but less than the second threshold value, keeping the current RRU transmission mode unchanged.

6. The method according to claim 2, wherein performing judgement comprises:
   when the current RRU transmission mode is that multiple RRUs transmit the downlink carrier signal:
   if the current downlink reception level or quality is greater than a fourth threshold value, selecting an RRU with the greatest uplink reception level among the two or more RRUs to transmit the downlink carrier signal; otherwise, keeping the current RRU transmission mode unchanged.

7. The method according to claim 1, wherein determining that at least one RRU among the two or more RRUs transmits a downlink carrier signal according to the current downlink reception level or quality of the user terminal, the uplink reception level or quality of each RRU, and power specification of each RRU, further comprises:
  performing judgment according to the current downlink reception level or quality of the user terminal, the uplink reception level or quality of each RRU, and the power specification of each RRU, so as to determine whether to switch from the current RRU transmission mode to that a corresponding RRU transmits the downlink carrier signal.

8. The method according to claim 7, wherein performing judgement comprises:
  when the current RRU transmission mode is that a single RRU transmits the downlink carrier signal:
  if a current downlink reception level or quality reaches a first threshold value, but an uplink reception level of the single RRU is not the greatest one among uplink reception levels of the RRUs, performing evaluation according to power specification and uplink path loss of an RRU with the greatest uplink reception level among the two or more RRUs and power specification and uplink path loss of the single RRU that currently transmits the downlink carrier signal, so as to determine whether to select the RRU with the greatest uplink reception level among the two or more RRUs to transmit the downlink carrier signal.

9. The method according to claim 7, wherein performing judgement comprises:
  when the current RRU transmission mode is that two RRUs transmit the downlink carrier signal:
  when a current downlink reception level or quality is greater than a third threshold value but less than a second threshold value, sorting uplink reception levels of the two or more RRUs in descending order to determine the first two RRUs;
  if at least one of the two RRUs that currently transmit the downlink carrier signal is not among the first two RRUs, performing evaluation according to power specification and uplink path loss of the RRU that is among the two RRUs that currently transmit the downlink carrier signal but is not among the first two RRUs ranked in order of the uplink reception level and power specification and uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

10. The method according to claim 1, further comprising:
  accessing, by the user terminal, the current RRU shared cell in the following manner:
  e: keeping that each RRU transmits the downlink carrier signal; and
  f: when an RRU selection decision cycle arrives, determining, according to the current downlink reception level or quality and the uplink reception level of each RRU, whether to switch from that each RRU transmits the downlink carrier signal to that a single RRU or two RRUs among the two or more RRUs transmit the downlink carrier signal.

11. The method according to claim 10, wherein f comprises:
  if the current downlink reception quality reaches a fifth threshold value and the uplink reception levels of at least two RRUs among the two or more RRUs reach a sixth threshold value, selecting the first two RRUs ranked in descending order of the uplink reception level among the at least two RRUs to send the downlink carrier signal; or
  if the current downlink reception quality reaches the fifth threshold value, and the uplink reception level of at least one RRU among the two or more RRUs reaches the sixth threshold value, selecting the RRU with the greatest uplink reception level among the at least one RRU to transmit the downlink carrier signal.

12. The method according to claim 1, further comprising:
  configuring, by the current RRU shared cell, the current RRU shared cell as a neighboring cell of the current RRU shared cell, so that when a switch decision cycle arrives, a broadcast control channel multi-transmission reception level of the current RRU shared cell is used for participation in switch decision and basic sorting.

13. A downlink direction remote radio unit (RRU) selection decision apparatus, comprising:
  a processor, configured to, acquire a signal indicating an arrival of an RRU selection decision cycle of a current RRU shared cell, the RRU shared cell comprising two or more RRUs;
  determine that at least one RRU among the two or more RRUs transmits a downlink carrier signal,
    i. according to a current reception level or quality of a user terminal and an uplink measurement item of each RRU, that at least one RRU among the RRUs transmits a downlink carrier signal; or
    ii. according to the current downlink reception level or quality of the user terminal, the uplink reception level or quality of each RRU, and power specification of each RRU,
  wherein a downlink channel comprises: a traffic channel and a stand-alone dedicated control channel; and
  determine a current RRU transmission mode based on a number of the at least one RRU among the two or more RRUs that transmits the download carrier signal.

14. The apparatus according to claim 13, further comprising:
  a first receiver; and
  wherein the processor is configured to:
  receive the current downlink reception level or quality of the user terminal and the uplink reception level or quality of each RRU through the first receiver; and
  perform judgment according to the current downlink reception level or quality and the uplink reception level of each RRU, so as to determine whether to switch from the current RRU transmission mode to that a corresponding RRU transmits the downlink carrier signal.

15. The apparatus according to claim 14, wherein performing the judgment according to the current downlink reception level or quality and the uplink reception level of each RRU comprises:
  performing RRU selection decision when the current RRU transmission mode is that a single RRU transmits the downlink carrier signal, and:
  when a difference between the current downlink reception level or quality and a first threshold value is greater than or equal to 0, keeping the current RRU transmission mode unchanged; or
  when the difference between the current downlink reception level or quality and the first threshold value is less than 0 and an estimated downlink diversity gain incurred by that two adjacent RRUs of the user terminal simultaneously transmit the downlink carrier signal is greater than an absolute value of the difference, selecting the two adjacent RRUs to transmit the downlink carrier signal; or when the difference between the current downlink reception level or quality and the first threshold value is less than 0 and the estimated downlink diversity gain incurred by that two adjacent RRUs of the user terminal simultaneously transmit the downlink carrier signal is less than or equal to the absolute value of the difference, selecting multiple RRUs among the two or more RRUs to transmit the downlink carrier signal.

16. The apparatus according to claim 15, wherein:

the processor is further configured to sort uplink reception levels of the two or more RRUs in descending order, and select the first two RRUs as the two adjacent RRUs of the user terminal; and the apparatus further comprises a first memory, configured to store correspondence between the estimated downlink diversity gain incurred by that the two adjacent RRUs of the user terminal simultaneously transmit the downlink carrier signal and a spatial distance between the two adjacent RRUs of the user terminal; or, store correspondence between the estimated downlink diversity gain incurred by that the two adjacent RRUs simultaneously transmit the downlink carrier signal and a difference between the uplink reception levels or quality of the two adjacent RRUs of the user terminal.

17. The apparatus according to claim 14, wherein performing the judgment according to the current downlink reception level or quality and the uplink reception level of each RRU comprises:

performing RRU selection decision when the current RRU transmission mode is that two RRUs transmit the downlink carrier signal, and:

when the current downlink reception level or quality is greater than a second threshold value, selecting an RRU with the greatest uplink reception level among the two or more RRUs to transmit the downlink carrier signal; or when the current downlink reception level or quality is less than a third threshold value, selecting multiple RRUs among the two or more RRUs to transmit the downlink carrier signal; or when the current downlink reception level or quality is greater than the third threshold value but less than the second threshold value, keeping the current RRU transmission mode unchanged.

18. The apparatus according to claim 14, wherein performing the judgment according to the current downlink reception level or quality and the uplink reception level of each RRU comprises:

performing RRU selection decision when the current RRU transmission mode is that multiple RRUs transmit the downlink carrier signal; and when the current downlink reception level or quality is greater than a fourth threshold value, selecting an RRU with the greatest uplink reception level among the two or more RRUs to transmit the downlink carrier signal; or when the current downlink reception level or quality is less than or equal to the fourth threshold value, keeping the current RRU transmission mode unchanged.

19. The apparatus according to claim 13, further comprising:

a second receiver; and a second memory, wherein the second memory stores power specification of each RRU; and wherein the processor is configured to:

receive the current downlink reception level or quality of the user terminal and the uplink reception level or quality of each RRU through the second receiver; and perform judgment according to the current downlink reception level or equality of the user terminal, the uplink reception level or quality of each RRU, and the power specification of each RRU, so as to determine whether to switch from the current RRU transmission mode to that a corresponding RRU transmits the downlink carrier signal.

20. The apparatus according to claim 19, wherein performing the judgment according to the current downlink reception level or quality of the user terminal, the uplink reception level or quality of each RRU, and the power specification of each RRU comprises:

when the current RRU transmission mode is that a single RRU transmits a downlink carrier signal, performing RRU selection decision, and if the current downlink reception level or quality reaches a first threshold value, but the uplink reception level of the single RRU is not the greatest one among uplink reception levels of RRUs, performing evaluation according to power specification and uplink path loss of an RRU with the greatest uplink reception level among the two or more RRUs and power specification and uplink path loss of the single RRU that currently transmits the downlink carrier signal, so as to determine whether to select the RRU with the greatest uplink reception level among the two or more RRUs to transmit the downlink carrier signal.

21. The apparatus according to claim 19, wherein performing the judgment according to the current downlink reception level or quality of the user terminal, the uplink reception level or quality of each RRU, and the power specification of each RRU comprises:

sorting the uplink reception levels of the two or more RRUs in descending order to determine the first two RRUs; and when the current RRU transmission mode is that two RRUs transmit the downlink carrier signal, performing RRU selection decision; if the current downlink reception level or quality is greater than a third threshold value but less than a second threshold value, performing evaluation according to power specification and uplink path loss of the RRU that is among the two RRUs that currently transmit the downlink carrier signal but is not among the first two RRUs ranked in order of the uplink reception level and power specification and uplink path loss of the RRU that is among the first two RRUs but does not currently transmit the downlink carrier signal, so as to determine whether to select the RRU, which is among the first two RRUs but does not currently transmit the downlink carrier signal, to replace the RRU, which is among the two RRUs that currently transmit the downlink carrier signal but is not among the first two RRUs ranked in order of the uplink reception level, to transmit the downlink carrier signal.

22. The apparatus according to claim 13, wherein:

the processor is further configured to, when the user terminal accesses the current RRU shared cell, keep that each RRU transmits the downlink carrier signal, and when the RRU selection decision cycle arrives, determine, according to the current downlink reception level or quality and the uplink reception level of each RRU, whether to switch from that each RRU transmits the downlink carrier signal to that a single RRU or two RRUs among the two or more RRUs transmit the downlink carrier signal.

* * * * *

UNITED STATES PATENT AND TRADEMARK OFFICE
CERTIFICATE OF CORRECTION

PATENT NO. : 10,064,065 B2
APPLICATION NO. : 14/732431
DATED : August 28, 2018
INVENTOR(S) : Yan et al.

Page 1 of 1

It is certified that error appears in the above-identified patent and that said Letters Patent is hereby corrected as shown below:

On the Title Page

Page 2, Item [56], delete "WO WO 2012093759 A1" and insert -- WO 2012093759 A1 --.

In the Claims

Column 28, Line 11, Claim 19 delete "reception level or equality" and insert -- reception level or quality --.

Signed and Sealed this
Twentieth Day of November, 2018

Andrei Iancu
*Director of the United States Patent and Trademark Office*